United States Patent
Djugash

(10) Patent No.: US 10,572,774 B2
(45) Date of Patent: Feb. 25, 2020

(54) METHODS AND ROBOTS FOR ADJUSTING OBJECT DETECTION PARAMETERS, OBJECT RECOGNITION PARAMETERS, OR BOTH OBJECT DETECTION PARAMETERS AND OBJECT RECOGNITION PARAMETERS

(71) Applicant: Toyota Motor Engineering & Manufacturing North America, Inc., Erlanger, KY (US)

(72) Inventor: Joseph Maria Angelo Djugash, San Jose, CA (US)

(73) Assignee: TOYOTA MOTOR ENGINEERING & MANUFACTURING NORTH AMERICA. INC., Plano, TX (US)

( * ) Notice: Subject to any disclaimer, the term of this patent is extended or adjusted under 35 U.S.C. 154(b) by 1847 days.

(21) Appl. No.: 13/706,809

(22) Filed: Dec. 6, 2012

(65) Prior Publication Data

US 2014/0161345 A1    Jun. 12, 2014

(51) Int. Cl.
*G06K 9/62* (2006.01)
*G06T 7/73* (2017.01)

(52) U.S. Cl.
CPC .............. *G06K 9/6262* (2013.01); *G06T 7/73* (2017.01)

(58) Field of Classification Search
None
See application file for complete search history.

(56) References Cited

U.S. PATENT DOCUMENTS

| 4,803,613 A | * | 2/1989 | Kametani et al. ................. 700/3 |
| 5,878,151 A | * | 3/1999 | Tang et al. ..................... 382/103 |
| 6,330,356 B1 | | 12/2001 | Sundareswaran et al. |
| 7,158,656 B2 | | 1/2007 | Covell et al. |

(Continued)

FOREIGN PATENT DOCUMENTS

| JP | 1998021393 A | 1/1998 |
| JP | 2012190422 A | 10/2012 |
| WO | 2011161084 A2 | 12/2011 |

OTHER PUBLICATIONS

Visual Grasp Affordances From Appearance-Based Cues, Song, et al., 2011 IEEE International Conference on Vision Workshops Computer.

(Continued)

*Primary Examiner* — Vikkram Bali
(74) *Attorney, Agent, or Firm* — Dinsmore & Shohl LLP

(57) ABSTRACT

Methods and robots for adjusting object detection parameters, object recognition parameters, or both object detection parameters and object recognition parameters are disclosed. Methods include receiving image data, automatically recognizing an object with an object recognition module based on the image data, determining whether a pose estimation error has occurred, and adjusting at least one object recognition parameter when the pose estimation error has occurred. Methods include receiving image data and automatically detecting a candidate object with an object detection module based on the image data, recognizing an object with an object recognition module based on the detected candidate object, determining whether an object recognition error has occurred, and adjusting the at least one object detection parameter when the object recognition error has occurred.

20 Claims, 3 Drawing Sheets

(56) References Cited

U.S. PATENT DOCUMENTS

| | | | |
|---|---|---|---|
| 7,206,435 B2* | 4/2007 | Fujimura et al. | 382/117 |
| 7,957,583 B2 | 6/2011 | Boca et al. | |
| 7,983,487 B2 | 7/2011 | Agrawal et al. | |
| 2006/0187305 A1 | 8/2006 | Trivedi et al. | |
| 2008/0301072 A1* | 12/2008 | Nagatsuka et al. | 706/12 |
| 2009/0190798 A1* | 7/2009 | Lee et al. | 382/103 |
| 2009/0252423 A1 | 10/2009 | Zhu et al. | |
| 2010/0215257 A1 | 8/2010 | Dariush et al. | |
| 2010/0262286 A1* | 10/2010 | Eidenberger et al. | 700/246 |
| 2013/0051626 A1* | 2/2013 | Abadpour et al. | 382/106 |
| 2013/0345875 A1* | 12/2013 | Brooks et al. | 700/259 |

OTHER PUBLICATIONS

Robust Pose Estimation of Moving Objects Using Laser Camera Data for Autonomous Rendezvous & Docking; Farhad Aghili, et al; http://www.isprs.org/proceedings/XXXVIII/3-W8/papers/p.41.pdf.

European Search Report dated Oct. 7, 2016 filed in European Application No. 13195819.1.

Dominic R. Maestas et al., "Scale Invariant Feature Transform (SIFT) Parametric Optimization Using Taguchi Design of Experiments", Nov. 10, 2010 (Nov. 10, 2010), Intelligent Robotics and Applications, Berlin Heidelberg, Springer Berlin, Heidelberg, pp. 630-641, XP019156093, ISBN: 978-3-642-16583-2.

Walter Wohlkinger et al., "3DNET: Large-scale object class recognition from CAD models", Robotics and Automation (ICRA), 2012 IEEE International Conference on, IEEE, May 14, 2012 (May 14, 2012), pp. 5384-5391, XP032450847, DOI: 10.1109/ICRA.2012.6225116; ISBN: 978-1-4673-1403-9.

Qian Zhu et al., "Automatic Tuning of Interactive Perception Applications", 26th Conference on Uncertainty in Artificial Intelligence (UAI2010), Jul. 8, 2010 (Jul. 8, 2010), pp. 1-9, XP055306380, Retrieved from the internet: URL: http://event/cwi.nl/uai2010/papers/UAI2010_0150.pdf [retrieved on Sep. 28, 2016].

Michael May et al., "Scale Invariant Feature Transform: A Graphical Parameter Analysis", BMVC, Aug. 31, 2010 (Aug. 31, 2010), pp. 1-11, XP055306021, Retrieved from the Internet: URL:https://www.bmva.org/bmvc/2010/workshop/paper5.pdf [retrieved on Sep. 27, 2016].

Arnau Ramisa et al., "Evaluation of the SIFT Object Recognition Method in Mobile Robots", 12th International Conference of the Catalan Association for Artificial Intelligence, Oct. 21, 2009 (Oct. 21, 2009), pp. 1-8, XP055306372, Retrieved from the Internet: URL:http://digital.csic.es/bitstream/10261/31483/1/Evaluation of the SIFT . . . IOS Press vol. 202.pdf [retrieved on Sep. 28, 2016].

Office Action received in JP Appln. No. 2013-252773 dated Jan. 9, 2018, 4 pages.

\* cited by examiner

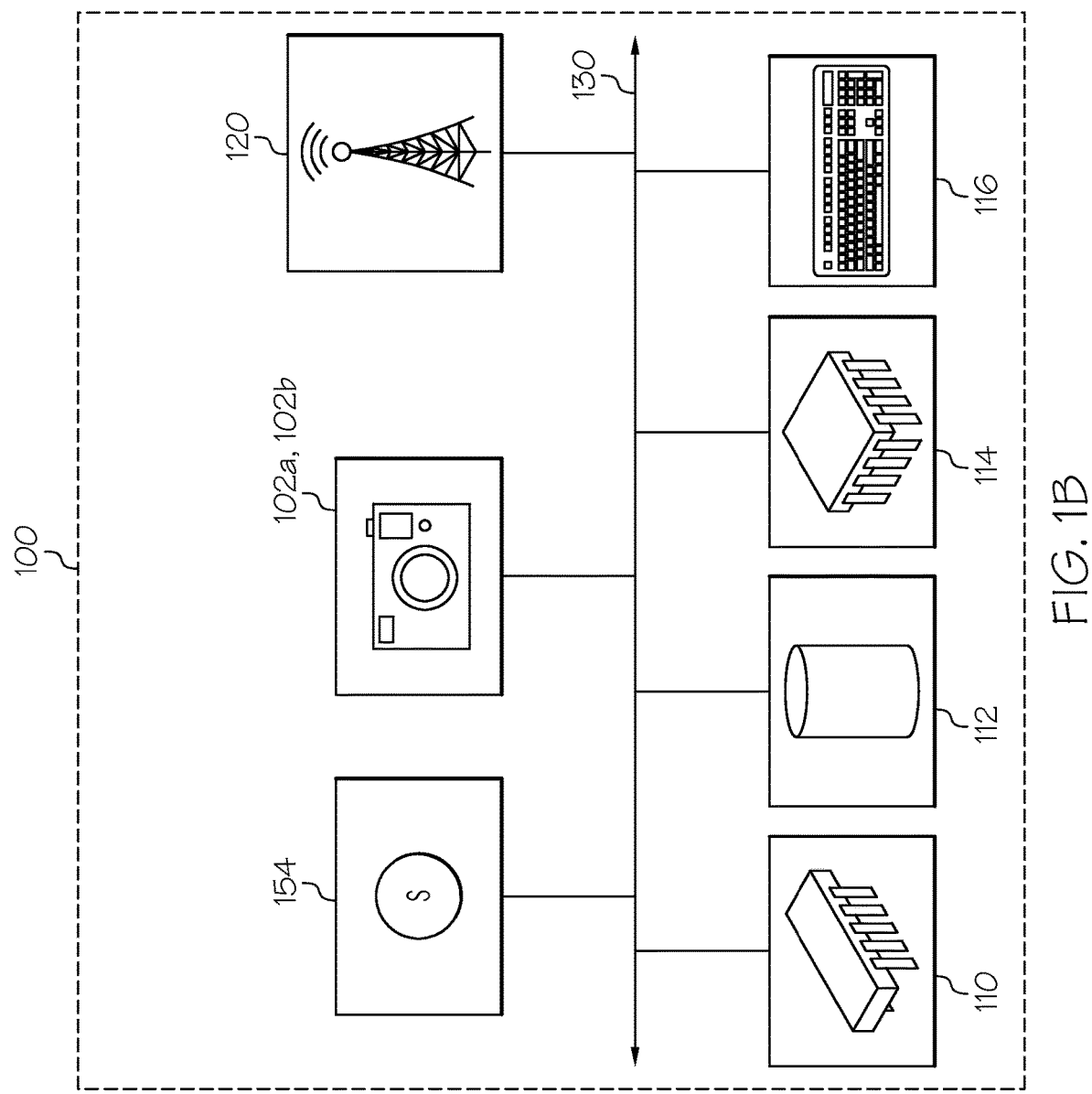

METHODS AND ROBOTS FOR ADJUSTING OBJECT DETECTION PARAMETERS, OBJECT RECOGNITION PARAMETERS, OR BOTH OBJECT DETECTION PARAMETERS AND OBJECT RECOGNITION PARAMETERS

TECHNICAL FIELD

The present disclosure generally relates to object detection and/or object recognition and, more particularly, methods and robots for adjusting object detection parameters, object recognition parameters, or both object detection parameters and object recognition parameters.

BACKGROUND

Object detection methods may be used to detect candidate objects in images. Object recognition methods may be used to recognize objects in images. Object detection methods may utilize object detection parameters in order to detect candidate objects in images. Object recognition methods may utilize object recognition parameters in order to recognize objects in images. It may be desirable to adjust object detection parameters, object recognition parameters, or both object detection parameters and object recognition parameters in order to improve the accuracy of object detection and object recognition methods.

Object detection and/or object recognition methods may be used in a variety of environments, such as image categorization systems, machine visions systems, and in robotic applications. For example, in robotic applications, robots may operate within a space to perform particular tasks. Robots may be deployed in factories, homes, offices, and healthcare facilities, among others. Servant robots may be tasked with navigating within the operating space, locating objects, and manipulating objects. For example, a robot may be commanded to find an object within the operating space, pick up the object, and move the object to a different location within the operating space. Robots commonly utilize vision-based object detection methods and/or object recognition methods to facilitate the manipulation of objects within an operating space. In order to aid robots in manipulating objects, it is desirable for the robot to employ accurate object detection and/or object recognition methods.

Accordingly, a need exists for alternative methods and robots for adjusting object detection parameters, object recognition parameters, or both object detection parameters and object recognition parameters.

SUMMARY

In one embodiment, a method for adjusting at least one object recognition parameter includes receiving image data and automatically recognizing an object with an object recognition module based on the image data. The object recognition module includes at least one object recognition parameter. The method further includes determining whether a pose estimation error has occurred and adjusting the at least one object recognition parameter when the pose estimation error has occurred.

In another embodiment, a method for adjusting at least one object detection parameter includes receiving image data and automatically detecting a candidate object with an object detection module based on the image data. The object detection module includes at least one object detection parameter. The method further includes recognizing an object with an object recognition module based on the detected candidate object. The object recognition module includes at least one object recognition parameter. The method further includes determining whether an object recognition error has occurred and adjusting the at least one object detection parameter when the object recognition error has occurred.

In yet another embodiment, a robot includes one or more processors, one or more image capture devices communicatively coupled to the one or more processors, a non-transitory memory component communicatively coupled to the one or more processors, an object detection module stored in the non-transitory memory component, an object recognition module stored in the non-transitory memory component, and machine readable instructions stored in the non-transitory memory component. The object detection module includes at least one object detection parameter. The object recognition module includes at least one object recognition parameter. When executed by the one or more processors, the machine readable instructions stored in the non-transitory memory component cause the robot to receive image data from the one or more image capture devices, detect a candidate object with the object detection module based on the image data, recognize an object with the object recognition module based on the detected candidate object, determine whether an object recognition error has occurred, and adjust the at least one object detection parameter when the object recognition error has occurred.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1B schematically depicts internal components of the robot of FIG. 1A, according to one or more embodiments described and illustrated herein.

DETAILED DESCRIPTION

Embodiments of the present disclosure are directed to methods and robots for adjusting object detection parameters, object recognition parameters, or both object detection parameters and object recognition parameters. The embodiments described herein may receive image data, automatically recognize an object with an object recognition module based on the image data, determine whether a pose estimation error has occurred, and adjust at least one object recognition parameter when the pose estimation error has occurred. The embodiments herein may receive image data, automatically detect a candidate object with an object detection module based on the image data, recognize an object with an object recognition module based on the detected candidate object, determine whether an object recognition error has occurred, and adjusting at least one object detection parameter when the object recognition error has occurred. Adjusting object detection parameters, object recognition parameters, or both object detection parameters and object recognition parameters, as described herein, may provide for improved accuracy in object detection and/or object recognition. Various embodiments of methods and robots for adjusting object detection parameters, object recognition parameters, or both object detection parameters and object recognition parameters are described in detail below.

As an initial matter, it should be noted that while the present disclosure depicts and describes an image processing system operable to process image data in order to detect objects and/or recognize objects that is coupled to a robot, in other embodiments, the image processing system described herein may not be coupled to a robot, such as in embodiments in which the image processing system is embedded within a mobile device (e.g., smartphone, laptop computer, etc.) or exists in isolation (e.g., in an image processing system that receives image data from a source external to the image processing system).

Figure 1A:
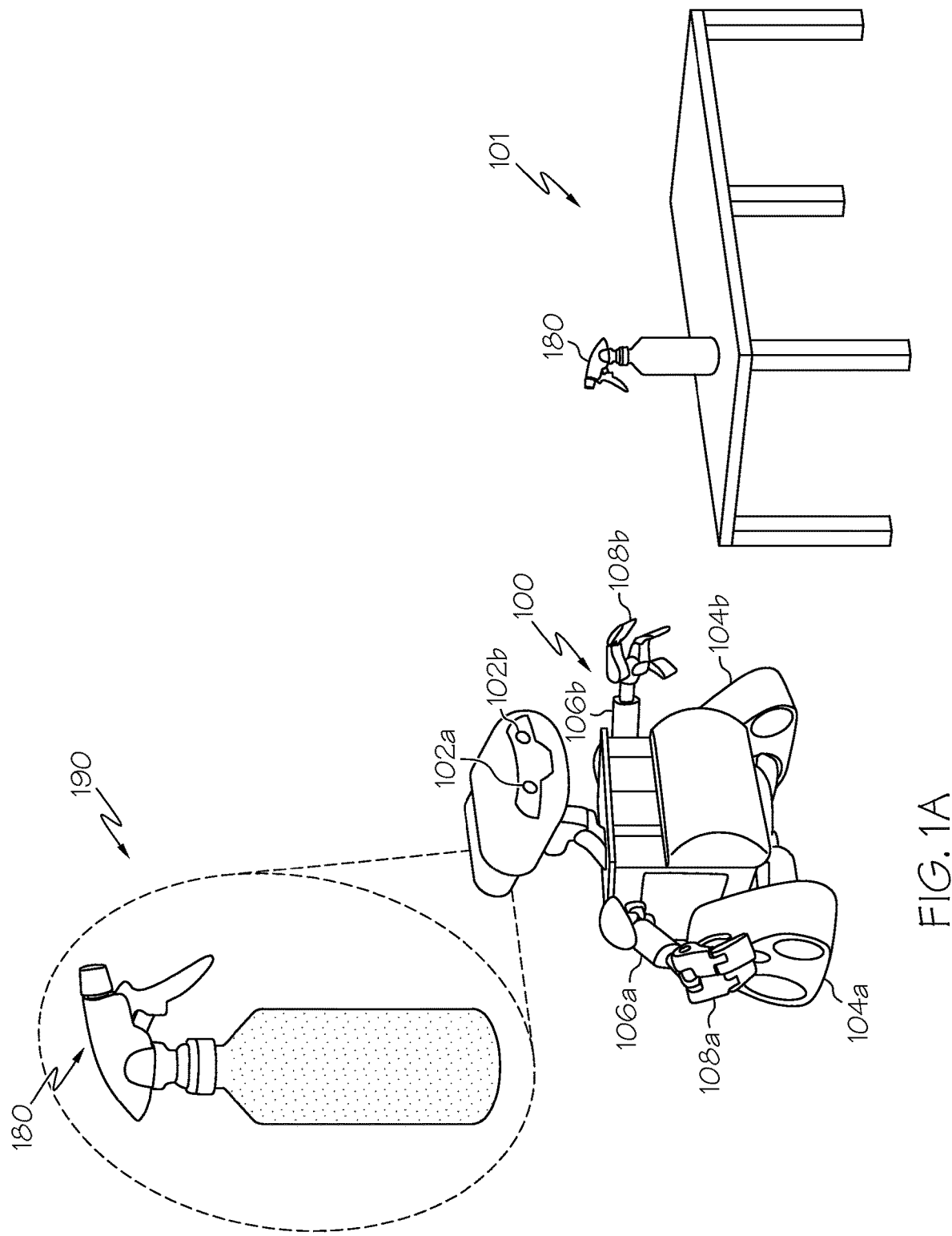
FIG. 1A schematically depicts a robot operating within an operating space, according to one or more embodiments described and illustrated herein.

Referring now to FIG. 1A, a robot 100 operating within an operating space 101 is illustrated. The robot 100, which is illustrated generically in FIG. 1A, may take on any size and configuration. For example, the robot 100 may be configured as service robot to assist humans in the home, workplace, school, or healthcare facility, such as the robot 100 illustrated in FIG. 1A. In another embodiment, the robot may be a production robot utilized within a manufacturing facility. It should be understood that the embodiments described herein are not limited to any type of robot.

The robot 100 illustrated in FIG. 1A generally comprises two image capturing devices 102a, 102b, two arms 106a, 106b, two gripping assemblies 108a, 108b, and two locomotion devices 104a, 104b. The image capturing devices 102a, 102b may be configured as digital cameras capable of acquiring still image and/or digital video. In an alternative embodiment, the robot 100 may be equipped with only one image capturing device to more than two image capturing devices. The image capturing devices 102a, 102b depicted in FIG. 1A may enable the robot 100 to detect objects, recognize objects, and estimate the pose of detected objects that are encountered within the operating space 101, as described below.

The locomotion devices 104a, 104b are utilized by the robot 100 to maneuver within the operating space 101. In the embodiment depicted in FIG. 1A, the locomotion devices 104a, 104b are tracked locomotion devices. However, in other embodiments, the robot 100 may include one or more locomotive devices other than a tracked locomotive device. For example, the robot 100 may maneuver within the operating space 101 using one or more wheels or legs. In some embodiments, the robot 100 may include only one locomotive device or more than two locomotive devices.

The arms 106a, 106b and gripping assemblies 108a, 108b may be servo-actuated in one embodiment to manipulate objects that the robot 100 encounters within the operating space. Other actuation mechanisms may be utilized, such as by pneumatic drives, hydraulic drives, electro-active polymer motors, etc. In some embodiments, the robot 100 may include only one arm and gripping assembly or more than two arms and gripping assemblies.

Referring now to FIG. 1B, various internal components of the robot 100 are illustrated. The robot 100 includes one or more processors 110, a data storage device 112, a non-transitory memory component 114, optional input/output hardware 116, the two image capturing devices 102a, 102b, an optional communications module 120, and actuator drive hardware 154. In some embodiments, the one or more processors 110, the data storage device 112, and the non-transitory memory component 114 may be provided in a single integrated circuit (e.g., a system on a chip). In some embodiments, the one or more processors 110, the data storage device 112, and the non-transitory memory component 114 may be provided as separate integrated circuits.

Each of the one or more processors 110 is configured to communicate with electrically coupled components, and may be configured as any commercially available or customized processor suitable for the particular applications that the robot 100 is designed to operate. Each of the one or more processors 110 may be any device capable of executing machine readable instructions. Accordingly, each of the one or more processors 110 may be a controller, an integrated circuit, a microchip, a computer, or any other computing device. The one or more processors 110 are coupled to a communication path 130 that provides signal interconnectivity between various modules of the robot 100. The communication path 130 may communicatively couple any number of processors with one another, and allow the modules coupled to the communication path 130 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 130 may be formed from any medium that is capable of transmitting a signal such as, for example, conductive wires, conductive traces, optical waveguides, or the like. Moreover, the communication path 130 may be formed from a combination of mediums capable of transmitting signals. In one embodiment, the communication path 130 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The non-transitory memory component 114 may be coupled to the communication path 130. The non-transitory memory component 114 may include a volatile and/or nonvolatile computer-readable storage medium, such as RAM, ROM, flash memories, hard drives, or any medium capable of storing machine readable instructions such that the machine readable instructions can be accessed by the one or more processors 110. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the non-transitory memory component 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The non-transitory memory component 114 may be configured to store one or more modules, each of which includes the set of instructions that, when executed by the one or more processors 110, cause the robot 100 to carry out the functionality of the module described herein. For example, the non-transitory memory component 114 may be configured to store a robot operating module, including, but not limited to, the set of instructions that, when executed by the one or more processors 110, cause the robot 100 to carry out general robot operations. Furthermore, the non-transitory memory component 114 may be configured to store an object detection module, an object recognition module, a pose estimation module, a detection tuner module, a recognition tuner module, and a robotic manipulation module, the functionality of which is described below with reference to FIG. 2. It should be understood that in some embodiments, the non-transitory memory component 114 may be configured to store only a subset of the object detection module, the object recognition module, the pose estimation module, the detection tuner module, the recognition tuner module, and the robotic manipulation module. Other data may be stored in the non-transitory memory component 114 to provide support for functionalities described herein.

The data storage device 112 may also be configured as volatile and/or nonvolatile computer-readable storage medium. In one embodiment, the data storage device 112 is a separate data storage component from the non-transitory memory component 114. In another embodiment, the data storage device 112 and the non-transitory memory component 114 are provided as a single data storage component (i.e., the databases and set of instructions are stored in a single data storage component). In yet another embodiment, the data storage device 112 may be remote from the robot 100, and remotely accessed via the optional communications module 120.

The image capturing devices 102a, 102b may be coupled to the communication path 130. The image capturing devices 102a, 102b may receive control signals from the one or more processors 110 to acquire image data of a surrounding operating space, and to send the acquired image data to the one or more processors 110 and/or the data storage device 112 for processing and/or storage. The image capturing devices 102a, 102b may be directly connected to the data storage device 112, or, in an alternative embodiment, include dedicated memory devices (e.g., flash memory) that are accessible to the one or more processors 110 for retrieval.

Each of the image capturing devices 102a, 102b may have any suitable resolution and may be configured to detect radiation in any desirable wavelength band, such as an ultraviolet wavelength band, a near-ultraviolet wavelength band, a visible light wavelength band, a near infrared wavelength band, or an infrared wavelength band. In some embodiments, at least one of the image capturing devices 102a, 102b may be a standard definition (e.g., 640 pixels× 480 pixels) camera. In some embodiments, at least one of the image capturing devices 102a, 102b may be a high definition camera (e.g., 1440 pixels×1024 pixels or 1280 pixels×1024). In some embodiments, at least one of the image capturing devices 102a, 102b may have a resolution other than 640 pixels×480 pixels, 1440 pixels×1024 pixels, or 1280 pixels× 1024. The image capturing devices 102a, 102b may provide image data in the form of digital video and/or one or more digital photographs.

The optional communications module 120 may be coupled to the communication path 130 and may be configured as a wireless communications circuit such that the robot 100 may communicate with external systems and devices. The optional communications module 120 may be configured to communicate over any type of wireless communications protocol, such as, but not limited to, satellite communication, WiFi, WiMax, cellular (e.g., 3G, 4G, LTE, etc.), and proprietary wireless communication protocol.

The actuator drive hardware 154 may comprise the actuators and associated drive electronics to control the locomotion devices 104a, 104b, the arms 106a, 106b, the gripping assemblies 108a, 108b, and any other external components that may be present in the robot 100. The actuator drive hardware 154 may be configured to receive control signals from the one or more processors 110 and to operate the robot 100 accordingly.

Referring once again to FIG. 1A, the robot 100 may operate within an operating space 101 and encounter a variety of objects. The robot 100 may be commanded or otherwise programmed to retrieve and/or manipulate a particular object, or it may be programmed to autonomously navigate within an operating space and manipulate objects that it encounters at-will. For example, in FIG. 1A, the robot 100 has encountered a spray bottle 180 positioned on top of a coffee table. The robot 100 may be programmed or otherwise instructed to find the spray bottle 180 and manipulate it in some manner. For example, a user operating the robot 100 may have instructed the robot 100 to find the spray bottle 180, pick it up, and bring it back to him or her. In this manner, the spray bottle 180 is the target object of the robot 100. Using the two image capturing devices 102a, 102b, the robot 100 obtains target image data of the spray bottle 180, which is represented by the target object image 190 illustrated in FIG. 1A. The target image data may be in the form of digital video and/or one or more digital photographs. The robot 100 may be programmed to detect a candidate object that may be the spray bottle 180 with the object detection module stored in the non-transitory memory component 114 and/or recognize the spray bottle 180 with the object recognition module stored in the non-transitory memory component 114 before attempting to perform a manipulation thereon. In order to improve the detection accuracy of the robot 100, it may be desirable to adjust the object detection parameters of the object detection module. Likewise, in order to improve the recognition accuracy of the robot 100, it may be desirable to adjust the object recognition parameters of the object recognition module.

Figure 2:
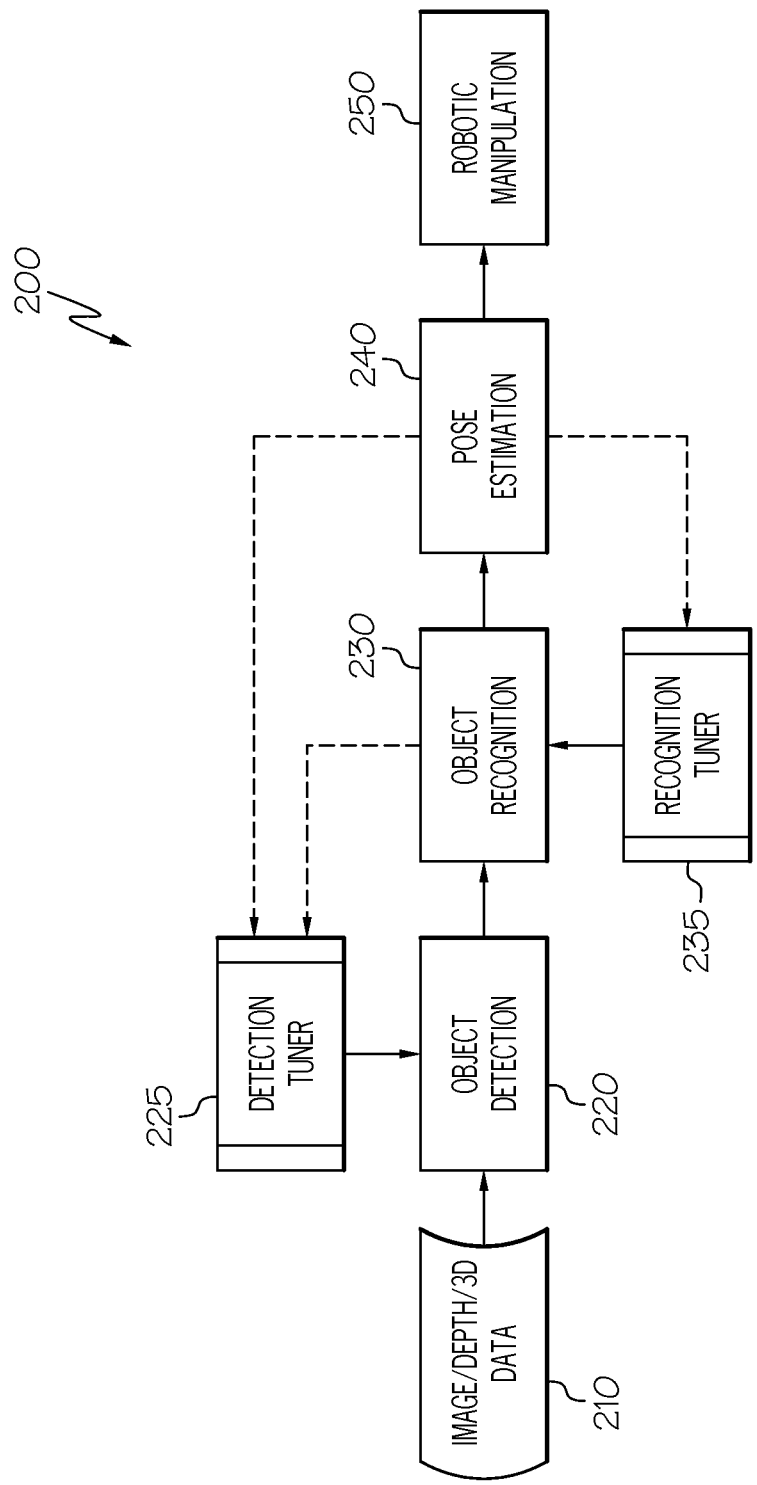
FIG. 2 schematically depicts a flowchart of a method of adjusting object detection and object recognition parameters, according to one or more embodiments described and illustrated herein.

Referring now to FIG. 2, a flowchart of a method 200 of adjusting object detection parameters, object recognition parameters, or both object detection parameters and object recognition parameters is schematically depicted. In some embodiments, the method 200 may be implemented as logic within the machine readable instructions that, when executed by the one or more processors 110, automatically adjust object detection parameters, object recognition parameters, or both object detection parameters and object recognition parameters. It is noted that, while the method 200 depicts a specific sequence, additional embodiments of the present disclosure are not limited to any particular sequence.

Referring now to FIGS. 1-2, at block 210 the robot 100 receives image data representative of the operating space 101. As noted above, in some embodiments, the robot 100 operates within an operating space 101 and is configured to acquire image data of the operating space 101 from the image capturing devices 102a, 102b, and to then send the acquired image data of the operating space 101 to the one or more processors 110 and/or the data storage device 112 for storage and/or processing. In some embodiments, the robot 100 may receive image data from a source external to the robot 100, such as via the optional communications module 120.

The image data received at block 210 may be data of a variety of forms, such as, but not limited to red-green-blue ("RGB") data, depth image data, three dimensional ("3D") point data, and the like. In some embodiments, the robot 100 may receive depth image data from an infrared sensor or other depth sensor, such as an infrared sensor or depth sensor integrated with the image capturing devices 102a, 102b. In other embodiments that include a depth sensor (e.g., an infrared sensor), the depth sensor may be separate from the image capturing devices 102a, 102b.

Still referring to FIGS. 1-2, at block 220, the machine readable instructions stored in the non-transitory memory component 114, when executed by the one or more processors 110, cause the robot 100 to detect a candidate object, with the object detection module, based on the image data received at block 210. In some embodiments, the object detection module may detect the candidate object by identifying a candidate region of the received image data, such as a region of the image that includes high entropy. For example, in the embodiment depicted in FIG. 1A, the object detection module may detect a high entropy region in the acquired target image data that includes the spray bottle 180. In some embodiments, the object detection module may utilize a sliding window algorithm to identify the candidate region of the received image data. In embodiments, the object detection module may detect the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments, the object detection module may bias detections to one or more spatially located regions of interest based on application, scene geometry and/or prior information.

The object detection module includes at least one object detection parameter to facilitate the detection of the candidate object. In some embodiments, the at least one object detection parameter is a window size, a noise filtering parameter, an estimated amount of light, an estimated noise level, a feature descriptor parameter, an image descriptor parameter, or the like.

Still referring to FIGS. 1-2, at block 230, the machine readable instructions stored in the non-transitory memory component 114, when executed by the one or more processors 110, cause the robot 100 to recognize an object, with the object recognition module, based on the image data received at block 210. In some embodiments, the object recognition module may recognize the object based on a candidate region identified by the object detection module.

In some embodiments, the object recognition module may recognize the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments in which the object recognition module utilizes a feature descriptor or image descriptor algorithm, the object recognition module may extract a set of features from a candidate region identified by the object detection module. The object recognition module may then access a reference set of features of an object recognition reference model from an object recognition database stored in the non-transitory memory component 114 or the data storage device 112 and then compare the extracted set of features with the reference set of features of the object recognition reference model. For example, in the embodiment depicted in FIG. 1A, the object recognition module may extract a set of features from the high entropy region of the acquired target image data that includes the spray bottle 180 and compare the extracted set of features to reference sets of features for one or more reference spray bottle models. When the extracted set of features match the reference set of features, the object recognition module may recognize an object (e.g., recognizing a spray bottle when the extracted set of features from the high entropy region of the acquired target image data that includes the spray bottle 180 match the reference set of features for a reference spray bottle model). When the extracted set of features does not match the reference set of features, an object recognition error has occurred (e.g., an object recognition error indicating that no object recognition reference model matches the candidate object). When an object recognition error has occurred (e.g., referring to the example of FIG. 1A, no reference spray bottle model exists in the non-transitory memory component 114 or the data storage device 112), the at least one object detection parameter may be adjusted to improve the accuracy of the object detection module, as described below with reference to block 225.

In some embodiments, the object recognition module may assign an identifier to the recognized object. For example, the identifier may be an object category identifier (e.g., "spray bottle" when the extracted set of features match the reference set of features for the "spray bottle category" or "cup" when the extracted set of features match the reference set of features for the "cup" object category) or a specific object instance identifier (e.g., "my spray bottle" when the extracted set of features match the reference set of features for the specific "my spray bottle" object instance or "my cup" when the extracted set of features match the reference set of features for the specific "my cup" object instance). The identifier may be used by the pose estimation module, as described below with reference to block 240.

The object recognition module includes at least one object recognition parameter to facilitate the recognition of the object. In some embodiments, the at least one object recognition parameter is a window size, a noise filtering parameter, an estimated amount of light, an estimated noise level, a feature descriptor parameter, an image descriptor parameter, or the like.

Still referring to FIGS. 1-2, at block 240, the machine readable instructions stored in the non-transitory memory component 114, when executed by the one or more processors 110, cause the robot 100 to estimate the pose of a recognized object, with the pose estimation module, based on the image data received at block 210. In some embodiments, the pose estimation module may estimate the pose of the object based on a candidate region identified by the object detection module and an identifier of the recognized object provided by the object recognition module.

In some embodiments, the pose estimation module may estimate the pose of the recognized object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments in which the pose estimation module utilizes a feature descriptor or image descriptor algorithm, the pose estimation module may extract a set of features from a candidate region identified by the object detection module. The pose estimation module may then access a reference set of features of a pose estimation reference model from a pose estimation database stored in the non-transitory memory component 114 or the data storage device 112 and then compare the extracted set of features with the reference set of features of the pose estimation reference model. For example, in the embodiment depicted in FIG. 1A, the pose estimation module may extract a set of features from the high entropy region of the acquired target image data that includes the spray bottle 180 and compare the extracted set of features to reference sets of features of a series of high resolution reference spray bottle models in multiple positions and/or orientations. When the extracted set of features match the reference set of features, the pose estimation module may estimate a pose (e.g., a position and/or orientation) of the object (e.g., referring to the example of FIG. 1A, when a high resolution reference spray bottle model matches the extracted set of features from the candidate region, the pose of the spray bottle may be estimated as the pose of the matched reference model). When the extracted set of features do not match the reference set of features, the pose estimation module may determine that a pose estimation error has occurred and calculate a degree of the pose estimation error. When a pose estimation error has occurred, the at least one object recognition parameter and/or the at least one object detection parameter may be adjusted to improve the accuracy of the object detection module and/or the object recognition module, as described below with reference to blocks 225 and 235.

It should be understood that the pose estimation module may estimate the pose of the recognized object in a number of ways other than utilizing feature descriptors or image descriptors. For example, in some embodiments, the pose estimation module may estimate the pose of the recognized object by comparing a candidate region to a three dimensional model or multiple two-dimensional models. In some embodiments, the model to which the candidate region is compared may be based on an identifier provided by the object recognition module.

Still referring to FIGS. 1-2, at block 250, the machine readable instructions stored in the non-transitory memory component 114, when executed by the one or more processors 110, cause the robot 100 to send control signals to the actuator drive hardware 154 in order to control the locomotion devices 104a, 104b, the arms 106a, 106b, the gripping assemblies 108a, 108b, and any other external components that may be present in the robot 100 to effectuate the manipulation of one or more objects. In some embodiments, the robotic manipulation of block 250 may be based on a six degree of freedom output provided by the pose estimation module.

As noted above, when an object recognition error has occurred, the at least one object detection parameter may be adjusted to improve the accuracy of the object detection module. Likewise, when a pose estimation error has occurred, the at least one object recognition parameter and/or the at least one object detection parameter may be adjusted to improve the accuracy of the object detection module and/or the object recognition module, as will now be described.

Still referring to FIGS. 1-2, at block 225, the machine readable instructions stored in the non-transitory memory component 114, when executed by the one or more processors 110, cause the robot 100 to adjust at least one object detection parameter of the object detection module, with a detection tuner module, when a pose estimation error has occurred or when an object recognition error has occurred. By way of nonlimiting example, in some embodiments, the detection tuner module may adjust the window size utilized by the object detection module when a pose estimation error has occurred or when an object recognition error has occurred. In some embodiments, the detection tuner module includes a detection tuner model and the detection tuner model adjusts the at least one object detection parameter based on the pose estimation error, the object recognition error, or both the pose estimation error and the object recognition error. In some embodiments, the detection tuner model maps the pose estimation error, the object recognition error, or both the pose estimation error and the object recognition error to the adjusted at least one object detection parameter. In some embodiments, the detection tuner model is a learned correlation model, such as a support vector machine ("SVM") model.

Still referring to FIGS. 1-2, at block 235, the machine readable instructions stored in the non-transitory memory component 114, when executed by the one or more processors 110, cause the robot 100 to adjust at least one object recognition parameter of the object recognition module, with a recognition tuner module, when a pose estimation error has occurred. By way of nonlimiting example, in some embodiments, the recognition tuner module may adjust the window size utilized by the object recognition module when a pose estimation scale error has occurred. In some embodiments, the recognition tuner module includes a recognition tuner model and the recognition tuner model adjusts the at least one object recognition parameter based on the pose estimation error. In some embodiments, the recognition tuner model maps the pose estimation error to the adjusted at least one object recognition parameter. In some embodiments, the recognition tuner model is a learned correlation model, such as a support vector machine ("SVM") model.

It should now be understood that adjusting object detection parameters, object recognition parameters, or both object detection parameters and object recognition parameters, as described herein, may provide for improved accuracy in object detection and/or object recognition. Adjusting object detection parameters, object recognition parameters, or both object detection parameters and object recognition parameters, as described herein, may also provide for improved accuracy in object detection and/or object recognition as the visual characteristics of a scene change over time (e.g., the lighting conditions change, the number of objects present in the scene changes, etc). Moreover, adjusting object detection parameters and/or object recognition parameters, as described herein may provide enhanced error detection (e.g., high pose estimation error may indicate that object recognition may be incorrect). Furthermore, adjusting object detection parameters and/or object recognition parameters, as described herein may facilitate fast and efficient object detection and/or object recognition, may reduce processing and data storage requirements, and/or may increase the robustness of object detection and/or object recognition to changes in lighting, viewpoint, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for adjusting at least one object recognition parameter comprising:
   receiving digital image data;
   automatically recognizing an object with an object recognition module based on the digital image data, wherein the object recognition module includes at least one object recognition parameter;
   determining whether a pose estimation error has occurred; and
   adjusting the at least one object recognition parameter when the pose estimation error has occurred.

2. The method of claim 1, wherein the at least one object recognition parameter is a window size, a noise filtering parameter, an estimated amount of light, an estimated noise level, a feature descriptor parameter, or an image descriptor parameter.

3. The method of claim 1, wherein the at least one object recognition parameter is adjusted by a recognition tuner module, wherein the recognition tuner module includes a recognition tuner model and the recognition tuner model adjusts the at least one object recognition parameter based on the pose estimation error.

4. The method of claim 3, wherein the recognition tuner model is a learned correlation model.

5. The method of claim 4, wherein the recognition tuner model maps the pose estimation error to the adjusted at least one object recognition parameter.

6. The method of claim 1, further comprising automatically detecting a candidate object with an object detection module based on the digital image data, wherein the object detection module includes at least one object detection parameter, and wherein the object is recognized based on the detected candidate object.

7. The method of claim 6, further comprising:
   adjusting the at least one object detection parameter when the pose estimation error has occurred.

8. The method of claim 7, wherein the at least one object detection parameter is a window size, a noise filtering parameter, an estimated amount of light, an estimated noise level, a feature descriptor parameter, or an image descriptor parameter.

9. The method of claim 7, wherein the at least one object detection parameter is adjusted by a detection tuner module, wherein the detection tuner module includes a detection tuner model and the detection tuner model adjusts the at least one object detection parameter based on the pose estimation error.

10. The method of claim 9, wherein the detection tuner model maps the pose estimation error to the adjusted at least one object detection parameter.

11. The method of claim 6, further comprising:
    determining whether an object recognition error has occurred; and
    adjusting the at least one object detection parameter when the object recognition error has occurred.

12. The method of claim 11, wherein the at least one object detection parameter is adjusted by a detection tuner module, wherein the detection tuner module includes a detection tuner model and the detection tuner model adjusts the at least one object detection parameter based on the pose estimation error.

13. The method of claim 1, further comprising:
    identifying a candidate region of the received digital image data; and
    extracting a set of features from the identified region, wherein the object recognition module recognizes the object by:
      accessing a reference set of features of an object recognition reference model from an object recognition database; and
      comparing the extracted set of features of the identified region with the reference set of features of the object recognition reference model.

14. The method of claim 1, further comprising assigning an identifier to the recognized object.

15. The method of claim 14, wherein the identifier is an object category identifier or a specific object instance identifier.

16. The method of claim 1, further comprising:
    identifying a candidate region of the received digital image data; and
    extracting a set of features from the identified region, wherein whether the pose estimation error has occurred is determined by:
      accessing a reference set of features of a pose estimation reference model from a pose estimation database, wherein the pose estimation reference model is selected based on the assigned identifier;
      comparing the extracted set of features of the identified region with the reference set of features of the pose estimation reference model; and
      determining that the pose estimation error has occurred when the extracted set of features of the identified region does not match the reference set of features of the pose estimation reference model.

17. A method for adjusting at least one object detection parameter comprising:
    receiving digital image data;
    automatically detecting a candidate object with an object detection module based on the digital image data, wherein the object detection module includes at least one object detection parameter;
    recognizing an object with an object recognition module based on the detected candidate object, wherein the object recognition module includes at least one object recognition parameter;
    determining whether an object recognition error has occurred;
    adjusting the at least one object detection parameter when the object recognition error has occurred;
    identifying a candidate region of the received digital image data;
    extracting a set of features from the identified region;
    determining whether a pose estimation error has occurred by:
      accessing a reference set of features of a pose estimation reference model from a pose estimation database, wherein the pose estimation reference model is selected based on the assigned identifier;

comparing the extracted set of features of the identified region with the reference set of features of the pose estimation reference model; and determining that the pose estimation error has occurred when the extracted set of features of the identified region does not match the reference set of features of the pose estimation reference model; and adjusting the at least one object recognition parameter when the pose estimation error has occurred.

18. The method of claim 17, wherein the at least one object detection parameter is a window size, a noise filtering parameter, an estimated amount of light, an estimated noise level, a feature descriptor parameter, or an image descriptor parameter.

19. The method of claim 17, wherein the at least one object detection parameter is adjusted by a detection tuner module, wherein the detection tuner module includes a detection tuner model and the detection tuner model adjusts the at least one object detection parameter based on the object recognition error.

20. A robot comprising:
one or more processors;
one or more image capture devices communicatively coupled to the one or more processors;
a non-transitory memory component communicatively coupled to the one or more processors;
an object detection module stored in the non-transitory memory component, wherein the object detection module includes at least one object detection parameter;
an object recognition module stored in the non-transitory memory component, wherein the object recognition module includes at least one object recognition parameter; and
machine readable instructions stored in the non-transitory memory component that cause the robot to perform at least the following when executed by the one or more processors:
receive digital image data from the one or more image capture devices;
detect a candidate object with the object detection module based on the digital image data;
recognize an object with the object recognition module based on the detected candidate object;
determine whether an object recognition error has occurred;
adjust the at least one object detection parameter when the object recognition error has occurred;
determine whether a pose estimation error has occurred; and
adjust the at least one object recognition parameter when the pose estimation error has occurred.

\* \* \* \* \*

UNITED STATES PATENT AND TRADEMARK OFFICE
CERTIFICATE OF CORRECTION

PATENT NO. : 10,572,774 B2  
APPLICATION NO. : 13/706809  
DATED : February 25, 2020  
INVENTOR(S) : Joseph Maria Angelo Djugash Page 1 of 1

It is certified that error appears in the above-identified patent and that said Letters Patent is hereby corrected as shown below:

On the Title Page

Item (56), other publications, cite no. 1, delete "Visual Grasp Affordances From Appearance-Based Cues, Song, et al., 2011 IEEE International Conference on Vision Workshops Computer." and insert --Visual Grasp Affordances From Appearance-Based Cues, Song, et al., 2011 IEEE International Conference on Computer Vision Workshops.--, therefor.

Signed and Sealed this
Fourteenth Day of April, 2020

Andrei Iancu
*Director of the United States Patent and Trademark Office*